United States Patent
Nguyen et al.

(10) Patent No.: US 7,188,650 B2
(45) Date of Patent: Mar. 13, 2007

(54) SIPED TIRE TREAD WITH HIGH TRANSVERSE STIFFNESS

(75) Inventors: Gia-Van Nguyen, Rossignol (BE); Anne-France Gabrielle Jeanne-Marie Cambron, Angelsberg (LU); Alain Francois Emile Roesgen, Asselborn (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 204 days.

(21) Appl. No.: 11/023,818

(22) Filed: Dec. 28, 2004

(65) Prior Publication Data

US 2006/0137793 A1  Jun. 29, 2006

(51) Int. Cl.
B60C 11/12 (2006.01)

(52) U.S. Cl. ............. 152/209.23; 152/902; 152/DIG. 3

(58) Field of Classification Search .......... 152/209.18, 152/209.21, 209.23, DIG. 3, 902
See application file for complete search history.

(56) References Cited

U.S. PATENT DOCUMENTS

| | | | |
|---|---|---|---|
| 2,121,955 A | 6/1938 | Eger | |
| 4,298,046 A | 11/1981 | Herbelleau et al. | |
| D334,370 S | 3/1993 | White | |
| 5,198,047 A | 3/1993 | Graas et al. | |
| 5,388,625 A | 2/1995 | White | |
| D362,215 S | 9/1995 | White | |
| D382,520 S | 8/1997 | Harpes et al. | |
| 5,733,393 A | 3/1998 | Hubbell et al. | |
| 5,783,002 A * | 7/1998 | Lagnier ................. | 152/DIG. 3 |
| 5,833,779 A | 11/1998 | van der Meer et al. | |
| D415,451 S | 10/1999 | Weber et al. | |
| 6,202,725 B1 * | 3/2001 | Moriya ................. | 152/DIG. 3 |
| D456,345 S | 4/2002 | Bawin et al. | |
| 6,374,884 B2 | 4/2002 | Matsuura et al. | |
| 6,382,283 B1 | 5/2002 | Caretta | |
| D458,580 S | 6/2002 | Young et al. | |
| 6,408,910 B1 * | 6/2002 | Lagnier et al. ........ | 152/DIG. 3 |
| 6,626,215 B2 | 9/2003 | Ikeda | |

(Continued)

FOREIGN PATENT DOCUMENTS

DE 4107547 * 9/1991

(Continued)

OTHER PUBLICATIONS

European Patent Office, European Search Report and Written Opinion in Application No. 05112461.8, Apr. 18, 2006, 4 pages.

*Primary Examiner*—Steven D. Maki
(74) *Attorney, Agent, or Firm*—Wood, Herron & Evans, LLP

(57) ABSTRACT

A tire includes a plurality of tread blocks disposed circumferentially around the tire. At least one sipe is formed into at least one of the tread blocks and is defined by first and second confronting sidewalls. The sipe has a cross-sectional profile in a plane generally perpendicular to the top surface of the tread block, which profile has a generally arcuate central portion and first and second ends separated by the central portion. The sidewalls are spaced apart at least one first width at the central portion of the sipe, and are spaced apart at least one second width at the ends, wherein the second width is greater than the first width. In one embodiment, the sipe has a cross-sectional profile having a stepped configuration.

6 Claims, 2 Drawing Sheets

U.S. PATENT DOCUMENTS

| | | |
|---|---|---|
| 6,695,023 B1 | 2/2004 | Saito |
| 2001/0002603 A1 | 6/2001 | Ideka |
| 2001/0054463 A1 | 12/2001 | Matsuura et al. |
| 2003/0201048 A1 | 10/2003 | Radulescu et al. |

FOREIGN PATENT DOCUMENTS

| | | | |
|---|---|---|---|
| EP | 0861741 A2 | | 9/1998 |
| JP | 62-241710 | * | 10/1987 |
| JP | 2-303908 | * | 12/1990 |
| JP | 4-173407 | * | 6/1992 |
| JP | 5-58118 | * | 3/1993 |
| JP | 8-197915 | * | 8/1996 |
| WO | WO01/60642 A1 | | 8/2001 |

* cited by examiner

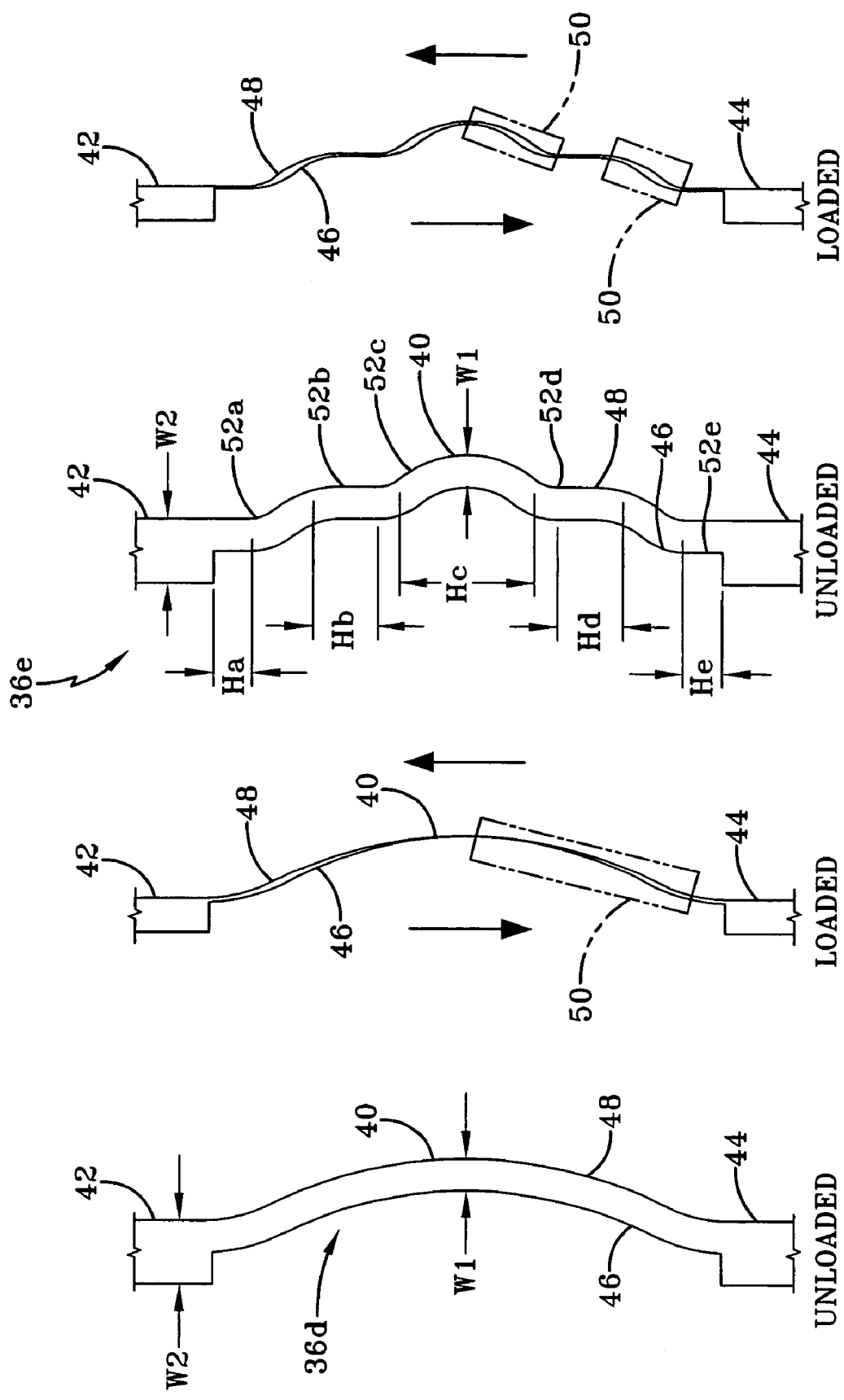

SIPED TIRE TREAD WITH HIGH TRANSVERSE STIFFNESS

FIELD OF THE INVENTION

The present invention pertains generally to pneumatic tires, and more particularly to a tire having an improved tread design.

BACKGROUND OF THE INVENTION

Various tire tread designs have been proposed to provide improved handling in various road conditions. In particular, it is known to provide sipes in a tire tread to improve worn-tire handling in wet, snowy, or icy road conditions. Providing sipes in a tire tread also helps to improve braking performance of a worn tire. It is also known, however, that the addition of sipes to a tire tread tends to decrease the stiffness of tread blocks, thereby degrading dry handling performance when the tire is new.

A need therefore exists for an improved tire tread design which provides improved worn-tire performance in wet, snowy or icy conditions, while also exhibiting good dry handling performance when the tire is new.

SUMMARY OF THE INVENTION

The present invention provides a siped tire tread that exhibits relatively high transverse stiffness compared to conventional siped tread designs. In one embodiment, a tire includes a tread having a plurality of tread blocks disposed circumferentially around the tire, and at least one sipe formed into at least one of the tread blocks. The sipe is defined by first and second confronting sidewalls and has a cross-sectional profile in a plane generally perpendicular to a top surface of the tread block. The cross-sectional profile has a generally arcuate central portion and first and second ends separated by the central portion. The first and second side walls are spaced apart at least a first width at the central portion, and are spaced apart at least a second width at the first and second ends of the sipe. The second width of the sipe is greater than the first width, so that the first and second sidewalls contact one another only along the central portion of the sipe when the tread block is deformed in a direction parallel to its top surface.

The features and objectives of the present invention will become more readily apparent from the following Detailed Description taken in conjunction with the accompanying drawings.

Definitions

"Axial" and "axially" refer to lines or directions that are parallel to the axis of rotation of the tire.

"Block element" and "tread block" refer to tread elements defined by a circumferential groove or shoulder and a pair of lateral extending grooves.

"Circumferential" means lines or directions extending along the perimeter of the surface of the annular tread, perpendicular to the axial direction.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion (the width of which is in question) divided by the length of such groove or groove portion; thus, the groove width is its average width over its length. Grooves may have varying depths in a tire. The depth of a groove may vary around the circumference of the tread, or the depth of one groove may be constant but vary from the depth of another groove in the tire.

"Lateral" means an axial direction.

"Radial" and "radially" refer to directions radially toward or away from the axis of rotation of the tire.

"Rib" means a circumferentially extending strip of rubber of the tread which is defined by at least one circumferential groove and either a second such groove or a lateral edge, the strip being laterally undivided by full-depth grooves.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2A is a schematic illustration depicting one embodiment of a sipe according to the present invention, in an unloaded condition;

FIG. 2B. is a schematic illustration depicting the sipe of FIG. 2A in a loaded condition;

FIG. 3A is a schematic illustration depicting another embodiment of a sipe according to the present invention, in an unloaded condition; and FIG. 3B is a schematic illustration depicting the sipe of FIG. 3A in a loaded condition.

DETAILED DESCRIPTION

Figure 1:
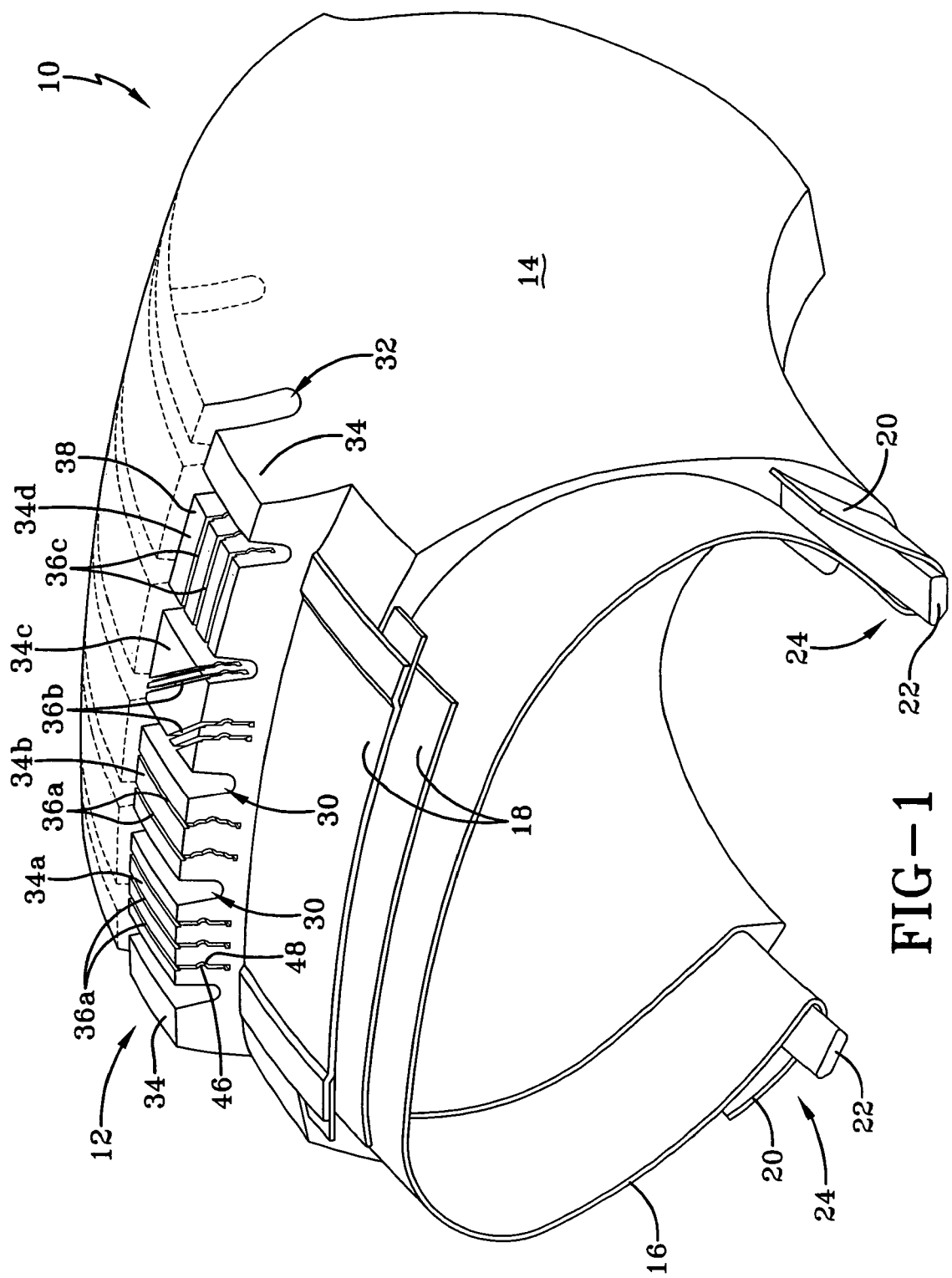
FIG. 1 is a partial cross-sectional view depicting detail of a tire according to the invention.

FIG. 1 depicts an exemplary tire 10 according to the present invention. The tire 10 includes a tread 12 and sidewalls 14 molded around a carcass reinforcing ply 16 and one or more belts 18 as known in the art. The carcass reinforcing ply 16 has opposed ends 20 which are wrapped around circumferentially extending bead cores 22 to form the rim engaging portions 24 of the tire. The tire tread 12 extends circumferentially around the tire 10 and includes one or more circumferentially extending grooves 30 and a plurality of laterally extending grooves 32 which intersect to define a plurality of tread blocks 34, 34a, 34b, 34c, 34d (referred to collectively as tread blocks 34) disposed around the circumference of the tire 10. The tread blocks 34 are provided with sipes 36a, 36b, 36c (referred to collectively as sipes 36) formed according to the present invention.

With continued reference to FIG. 1, detail of the sipes 36 formed into the tread blocks 34 will now be described. Each tread block 34 has a top surface 38 facing radially outwardly of the tire. One or more sipes 36 are formed into the tread blocks 34, from the top surfaces 38, and extend radially inwardly toward the axial center of the tire 10. Accordingly, each sipe 36 comprises a narrow groove defined by first and second confronting sidewalls 46, 48. The sipes 36 have a cross-sectional profile in a plane that is generally perpendicular to the top surface 38 of the tread block 34. Accordingly, the sipes 36 may be aligned to extend generally in a circumferential direction, as depicted by tread blocks 34a, 34b and sipes 36a, a generally lateral direction, as depicted by tread block 34d and sipes 36c, or in a direction which forms an angle with the circumferential and lateral directions, as depicted by tread block 34c and sipes 36b.

One embodiment of a sipe 36d according to the present invention is depicted in FIG. 2A. As shown in FIG. 2A, the cross-sectional profile of the sipe 36d includes a generally arcuate central portion 40 and first and second ends 42, 44 separated by the central portion 40. The first and second sidewalls 46, 48 are spaced apart by a first width W1 along the central portion 40 of the sipe 36d, and are spaced apart a second width W2, greater than the first width W1, at the first and second ends 42, 44 of the sipe 36d. In one embodiment, the width W1 between the first and second sidewalls 46, 48 is approximately 0.1 mm to approximately 0.6 mm, and the width W2 is approximately 0.5 mm to approximately 1.0 mm. In yet another embodiment, only the second end 44 of the sipe is spaced apart a second width W2 that is greater than the first width W1. In this embodiment, the first end 42 has a width substantially equal to the first width W1.

When a tread block 34 having a sipe as described above is loaded in a direction transverse to orientation of the sipe 36 in the tread block, the first and second sidewalls 46, 48 will contact one another along the central portion 40, as depicted in FIG. 2B. When the central portions 40 of the sidewalls 46, 48 contact one another, areas of high friction (indicated, for example, by the enclosed rectangle 50) are created between the confronting sidewalls 46, 48, which are caused to move in opposite directions by the transverse loading. These areas of high friction help the tread blocks 34 resist further deflection in directions transverse to the orientation of the sipe, (i.e., parallel to the top surface 38 shown in FIG. 1) thereby increasing the apparent stiffness of the tread block 34. The wider second widths W2 of the first and second ends 42, 44 facilitate movement of the first and second sidewalls 46, 48 toward one another, and maintain a narrow opening at the top surface 38 of the tread block 34 to provide improved traction in wet, snowy, or icy conditions.

FIG. 3A depicts another exemplary cross-sectional profile of a sipe 36e according to the present invention. Features of sipe 36e similar to those shown and described above have been similarly numbered. In this embodiment, the sipe 36e has a stepped profile in its central portion 40. The stepped profile includes a plurality of segments 52a, 52b, 52c, 52d, 52e, wherein each segment has a height dimension Ha, Hb, Hc, Hd, He in a direction generally perpendicular to the top surface 38 of the tread block 34. For each segment 52a, 52b, 52c, 52d, 52e, the ratio of the first width W1 to the segment height Ha, Hb, Hc, Hd, He is approximately 1/12 to approximately 1/4. In another embodiment, the ratio of segment width to segment height is approximately 1/10 to approximately 1/5.

FIG. 3B depicts the sipe of FIG. 3A in a loaded condition. Again, the first and second sidewalls 46, 48 contact one another along the central portion 40 of the sipe 36e, while the first and second ends 42, 44 remain separated. The contact between the first and second sidewalls 46, 48 creates areas of high friction indicated, for example, by enclosed rectangles 50. The stepped profile provides further resistance to deformation of the tread blocks 34 in directions transverse to the sipe orientation (i.e., parallel to the top surface 38 of the tread block 34).

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A tire, comprising;
   a tread including a plurality of tread blocks disposed circumferentially around the tire, each said tread block having a top surface; and
   a least one sipe formed into at least one of said tread blocks;
   said sipe defined by first and second confronting sidewalls and having a cross-sectional profile in a plane generally perpendicular to said top surface of said tread block, said profile having a generally arcuate central portion and first and second ends separated by said central portion, said first and second sidewalls spaced apart at least one first width at said central portion, and spaced apart at least one second width at one of said first and second ends, said second width greater than said first width such that said first and second sidewalls contact one another along said central portion under deformation in a direction parallel to said top surface;
   said sipe further comprising a stepped profile in said central portion;
   said stepped profile comprising alternating, substantially straight segments and curved segments, wherein said substantially straight segments are substantially perpendicular to said top surface, and said segments are arranged such that said central portion of said sipe is generally convex from said first end to said second end.

2. The tire of claim 1, wherein said stepped profile comprises a plurality of segments, each said segment having a height dimension in a direction generally perpendicular to said top surface of said tread block, the ratio of said first width to said height dimension at each segment being approximately 1/12 to approximately 1/4.

3. The tire of claim 1, wherein said stepped profile comprises a plurality of segments, each said segment having a height dimension in a direction generally perpendicular to said top surface of said tread block, the ratio said first width to said height dimension at each segment being approximately 1/10 to approximately 1/5.

4. The tire of claim 1, wherein said sipe is aligned with a circumferential direction of a tire.

5. The tire of claim 1, wherein said sipe is aligned with a lateral direction of a tire.

6. The tire of claim 1, wherein said sipe forms an angle with circumferential and lateral directions of the tire.

* * * * *